United States Patent Office 3,055,505
Patented Sept. 25, 1962

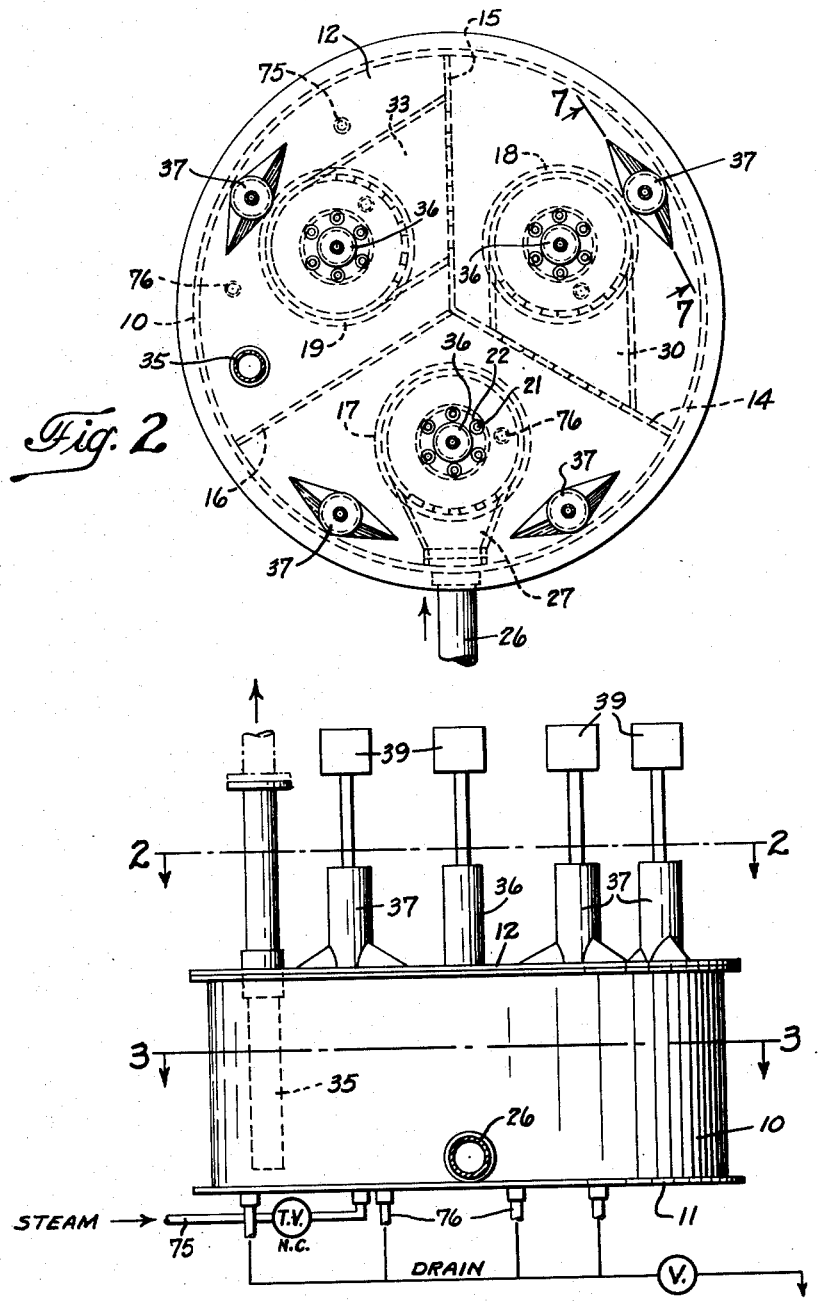

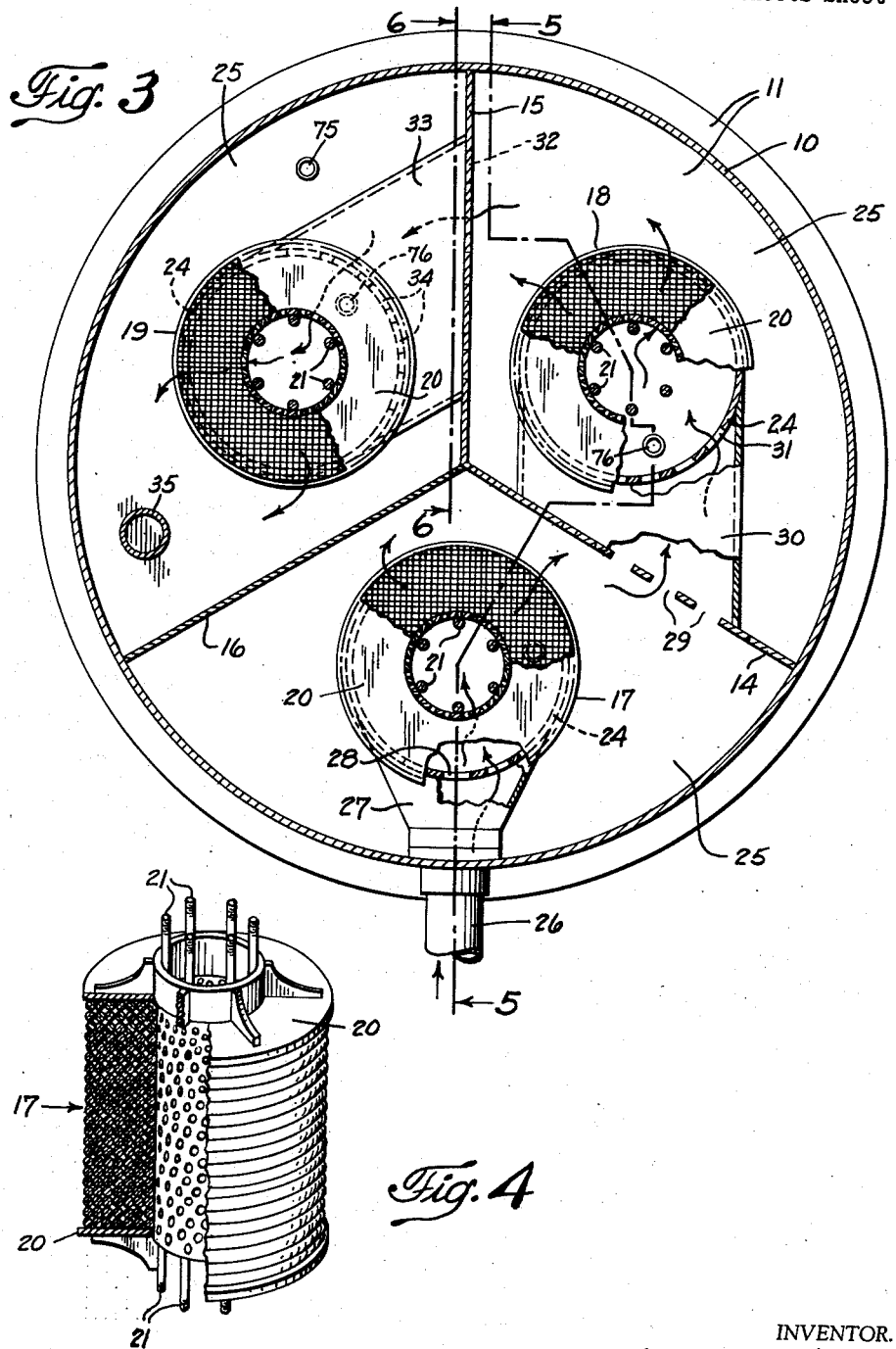

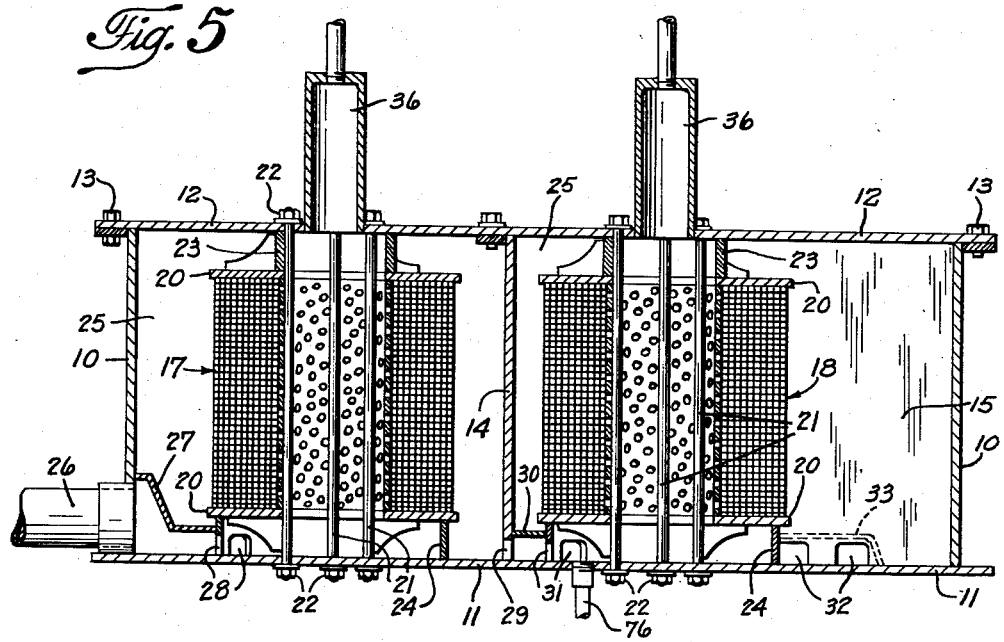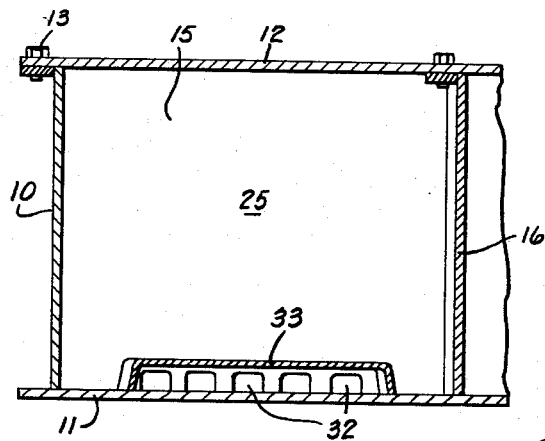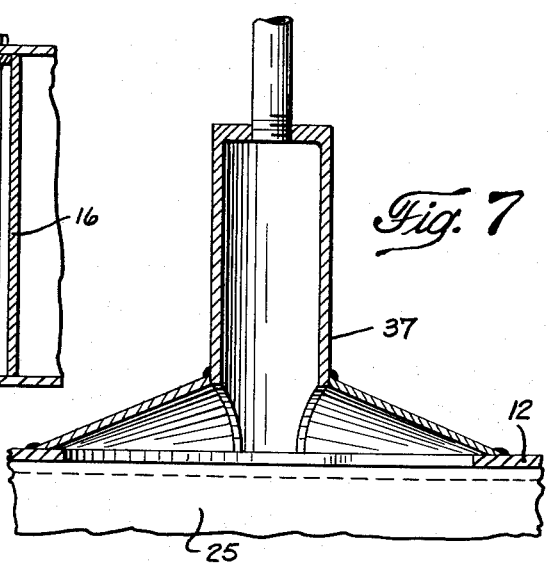

3,055,505
APPARATUS FOR SEPARATING MIXED LIQUIDS
Archibald Lawson, Staatsburg, N.Y., assignor to Lawson Products Corporation, New York, N.Y., a corporation of New York
Filed July 1, 1959, Ser. No. 824,296
2 Claims. (Cl. 210—335)

This invention relates generally to improvements in apparatus for separating mixed non-miscible liquids of different specific gravities, and especially for separating oil from water in boiler feed water and like mixtures.

Apparatus of the type here concerned have a number of separator elements spaced from one another and through which the liquid mixture is made to flow. Each of the separator elements is provided with a foraminous body or mass of interstices which causes one constituent of the mixture to coalesce into coarse globules. These globules, being of different specific gravity than the other constituent, either rise to the top or fall to the bottom of the apparatus where they can be drawn off. For example, with oil particles of specific gravity less than one, dispersed in water, the separator coalesces the oil particles into globules which rise to the top of the apparatus and can be drawn off.

A number of such separator elements customarily are provided because one element alone does not remove all of the constituent to be separated from the other constituent of the mixture, but only a portion thereof. The portion of one constituent separated by the element divided by the total amount of that constituent entering the element represents the element's "efficiency." Additional separator elements are used to separate further portions of the constituent left in the mixture by the first separator element.

It is common in the present practice to use at least three circular separator elements in boiler feed water applications, with the elements concentrically arranged. This is because, in such instances, it is desired that less than 50 parts of oil be left in one million parts of water. Three circular elements concentrically arranged allow a swirling action of the mixture and produce separation of the desired extremely high efficiency. Apparatus of this type is disclosed in my patent with Young, No. 2,432,317.

With mixtures having the same proportions of constituents, it has been found that the gross output of the apparatus is a function of the velocity of the liquid mixture as it passes through the separator element, but a large increase in velocity to achieve large gross output may result in decreasing the efficiency so markedly as to be impractical.

When the separator elements are concentrically arranged to obtain extremely high efficiency, as is common in present practice, the velocity of the liquid mixture is greater in the innermost element as compared to the outermost element. The velocity and consequently the output of the outer elements must be maintained at a low level lest the velocity in the inner element reach the point where the inner element's efficiency drops off. Consequently, the gross output of the apparatus as a whole is limited.

Still further, with such apparatus, each of the separator elements must be designed and installed with sensitive tolerances. The position of each element with respect to the others has substantial effect on efficiency and output. Consequently, construction and installation involve expensive techniques and labor.

The above difficulties are obviated by the present invention. Speaking generally, the present invention provides a relatively simple apparatus in which both the extremely high desired efficiency and high levels of gross output are simultaneously obtained. Maximum output can be achieved in all elements equally. Relatively large change in position of one element with respect to another has no apparent effect on either gross output or efficiency. The apparatus can be constructed and installed with standard techniques. Moreover, it is fully reversible. Efficient liquid separation will be obtained with flow in either direction, thus providing for more flexible use of the apparatus.

Briefly, this is accomplished by providing an apparatus having a closed housing divided by vertical partitions into sections. A separator element with a hollow interior and with foraminous walls is positioned within each section and extends vertically from the bottom to the top of the housing to form a well outside of the separator element in each section. The housing is provided with an inlet orifice for entry of the liquid mixture on one of its sides adjacent a section. This inlet opening communicates with the interior of the foraminous separator element (preferably at the bottom thereof) in that section. The partition separating that section from the next adjacent or succeeding section has transfer ports at the bottom of the partition leading from the well in the first section, and which communicate with a closed duct in the next section. The duct leads to the bottom and interior of the foraminous separator element in the next succeeding (second) section. In turn, the partition separating the second section from the next succeeding or third section is provided with transfer ports at its bottom leading from the well in the second section. These transfer ports in turn communicate with a closed duct leading to the bottom and interior of the foraminous separator element in the next succeeding or third section. This arrangement of transfer ports and closed ducts is repeated through to the last section. The last section is also provided with an outlet opening adjacent the bottom of the housing for passage of the liquid of higher specific gravity to a point outside the housing; and all of the sections have outlets at the top of the housing for the passage of the liquid of lower specific gravity to a point outside the housing.

Preferably, the closed housing is of cylindrical shape and is provided with partitions to form three sections.

Preferably, the separator elements have a circular cross-section.

An illustrative embodiment of the invention is shown in the accompanying drawings.

FIGURE 1 is a side elevation of the apparatus of the invention;

FIGURE 2 is a plan section view through the superstructure of the apparatus on the line 2—2 of FIGURE 1;

FIGURE 3 is a plan section view through the central body portion of the apparatus on the line 3—3 of FIGURE 1;

FIGURE 4 is a detailed perspective view, partly in section, of one of the foraminous separator elements comprising a part of the apparatus of the invention;

FIGURE 5 is a vertical section view on the line 5—5 of FIGURE 3;

FIGURE 6 is a vertical section view on the line 6—6 of FIGURE 3; and

FIGURE 7 is a vertical section view on the line 7—7 of FIGURE 2.

Referring now to the preferred embodiment of the invention shown for illustration in the drawings, wherein three sections for separation are assumed, and the direction of liquid flow from the first section to the third section is assumed, the reference character 10 indicates a closed housing, preferably cylindrical in form. It is closed by a bottom wall 11 and by a top or cover member 12; the latter being preferably secured by bolts 13.

Arranged within the interior of the housing 10 are three partitions 14, 15 and 16 which extend vertically from the bottom to the top of the housing to provide three sections sealed one from the other except as hereinafter described. A separator element (17, 18 and 19) is positioned in the interior of each of the sections. Each separator element has a spool-like structure (FIGURE 4) with a hollow interior and with walls of circular cross section. The elements have spool heads 20, to which are secured upright rods 21. The walls have a foraminous body structure consisting of strands of mesh wound around the rods between the spool heads. This mesh has a plurality of interstices and, preferably, a thin hard carbonaceous layer is applied to the mesh in accordance with the teachings of my Patent Number 2,651,414. Each of the separator elements is secured to the housing by means of nuts 22 on the rods 21. A liquid tight ring 23 is provided between the top spool head of each element and the top 12 of the housing to seal the interior of the element from the rest of the section. Similarly, a liquid tight ring 24 is provided between the bottom spool head of each element and the bottom 11 of the housing to seal off the interior of the separator element. Thus, each separator element provides a well 25 in that portion of the section outside of the separator element.

The side of the housing has an inlet orifice 26 near the bottom 11 adjacent to one of the sections, hereinafter called the first section. This inlet 26 communicates to the bottom ring 24 of the separator element 17 in that section by means of a closed duct 27. Entrance ports 28 in bottom ring 24 of element 17 permit passage of liquid from the duct 27 to the interior of separator 17. Transfer ports 29, consisting of orifices at the bottom of partition 14, communicate from the well in the first section to the second section. A duct 30 positioned on the bottom 11 of the housing in the second section separates transfer ports 29 from the well in the second section and leads to the bottom ring 24 of the separator element 18 in the second section. Orifices 31 in the bottom ring 24 of separator element 18 permit liquid to pass from duct 30 into the interior of separator element 18. Similarly, partition 15 has transfer ports 32 communicating between the well in the second section and the third section. A duct 33 positioned on the bottom 11 in the third section separates transfer ports 32 from the well in the third section and communicates with the bottom ring 24 of separator element 19. Orifices 34 in the bottom ring 24 of separator element 19 permit passage of liquid from the duct 33 to the bottom and interior of the element 19.

The third section (the last section of this illustrative embodiment of the invention) contains a vertical pipe 35 suspended with its opening adjacent to the bottom 11 of the housing to form an outlet in the section for the passage of the liquid of higher specific gravity to the outside of the apparatus.

Above the interior of each separator element 17, 18 and 19 and communicating therewith is a reservoir 36 extending upwardly from the top 12 of the housing. See FIGURE 5. Similarly mounted on the top 12 of the housing is a liquid delivery dome 37 above the well in each section and communicating therewith for additional collection of liquid of lower specific gravity—with at least one such dome for each section. See FIGURE 7. All of the domes 37 and the reservoirs 36 have suitable drain lines (not shown) for passage of the liquid of lower specific gravity therefrom to a desired place outside of the housing, as will be understood.

Each reservoir 36 and dome 37 also has air vent means 39 extending upwardly for desired venting.

In the operation of the apparatus, e.g. to separate oil from boiler feed water wherein the oil is of lower specific gravity than the water, the mixture of water and oil is delivered into the interior of the housing 10 through the inlet 26, thence through the duct 27 and orifices 28 into the interior of the separator element 17 at the bottom thereof in the first section. As the liquid mixture accumulates within the separator element, the pressure forces the mixture to penetrate the foraminous body of the walls. The liquid mixture moves laterally through the foraminous body of the separator element 17 and passes into the well 25 in the first section. Any large bodies of oil existing in the oil-water mixture generally do not penetrate the foraminous mass but float upwardly where they are collected in reservoir 36. The remainder of the mixture passes through the separator element, where the smaller particles of oil in the mixture are to a considerable extent retarded by contact with the mesh material of the foraminous mass. Many of them gather together and coalesce, thus forming large oil globules or bodies, which upon emergence from the separator element float to the surface of the liquid in well 25 of the first section. In addition, a substantial portion of the coalesced oil rises upwardly through the foraminous mesh and escapes radially outwardly at the top of the separator element. This oil floats on top of the liquid in the well of the first section and eventually collects in the dome 37 of the first section along with the other coalesced oil in the well.

The remaining portion of the liquid mixture, having passed into the well 25 of the first section, is forced by the pressure through transfer ports 29 in partition 14, thence through duct 30 in the second section, thence through orifices 31 and into the hollow interior at the bottom of separator element 18. The continuing pressure forces a further separation of the liquid mixture in passing through the walls of the second separator element 18 similar to that described in connection with separator element 17. A substantial portion of oil is coalesced into globules and separated and rises to the surface in the well 25 of the second section to be collected in its dome 37; another portion of separated oil similarly rises within separator element 18 itself and is collected in its reservoir 36.

Continued pressure forces the remaining liquid mixture through transfer ports 32 in partition 15, thence through duct 33 in the third section and through orifices 34 to the bottom interior of element 19. The separation effect is repeated in this section, and any remaining oil in the mixture is separated and collected in dome 37 and reservoir 36 of the third section.

The liquid in well 25 of the third section is substantially oil free and the water is drawn off near the bottom 11 of the housing in the third section through outlet pipe 35.

It is to be understood that the liquid mixture is continually forced through the apparatus.

Separation of the mixture occurs simultaneously in all three sections. Velocity of the mixture and efficiency of the separation is the same in all three sections so that high gross output and efficiency is achieved.

Additional use of the apparatus of the invention illustrated and described above is provided by placing it in an upside down position. The same results of high efficiency and high gross output are achieved. With some commercial applications it may be desirable to so position and operate the apparatus, particularly when it is desired to separate oil-water mixtures in which the oil has a higher specific gravity than water. In such an upside down position, the transfer ports are at the top of the partitions, the closed ducts communicate with the separator elements at the tops thereof, the collection and outlet domes 37 and reservoirs 36 are located at the bottom of each section, and the final discharge outlet 26 is at the top of the last section. The operation of the device in this position proceeds as described above, as will be understood, except that the heavy liquid constituent, e.g. oil, collects and flows downwardly for discharge through the reservoirs 36 and domes 37 at the bottom of the sections and the lighter liquid constituent, e.g. water, is drawn off and discharged at the top of the last section through outlet 26.

An equivalent form of the apparatus illustrated and described above may be used in an equivalent operation wherein the liquid mixture is introduced into the third section and flows in a reverse manner through the ports, ducts and separators with final discharge from the first section. With this equivalent reverse operation, the mixture of liquids to be separated is introduced into the housing through the previously described outlet pipe 35 in the third section which in this operation is an inlet. The liquid mixture enters the well therein, passes inwardly through the walls of the separator 19 to the interior thereof and thence through orifices 34 into duct 33. During such passage, the same separation described above occurs with the liquid of lower specific gravity collecting in dome 37 and reservoir 36 of the third section (if the apparatus is positioned right side up). The remaining mixture passes through transfer ports 32 in partition 15 into the well 25 of the second section, thence inwardly through the walls of the second separator element 18 thereby undergoing more separation as will be understood from the foregoing, thence into duct 30 and through ports 29 in partition 14 into well 25 of the first section, and thence through the walls of the first separator element 17 undergoing final separation. The mixture is now essentially free of the lighter liquid constituent and passes through duct 27 and is discharged by orifice inlet 26, which in this operation is an outlet.

After a suitably prolonged period of use, it is desirable to cleanse the interior of the housing sections and especially the foraminous bodies or interstitial masses of the separator element walls. This may be done by first shutting off liquid mixture supply inlet 26 and all discharge outlets. Then live steam is discharged under pressure from a pipe 75 which is suitably disposed with its outlet within the bottom interior of the housing. The steam will churn the liquid within the interior of the housing with strong washing and cleansing effect. Drain pipes 76 may also be provided to lead outwardly from the bottom of the housing 10, which when opened may be utilized to drain away the liquid.

Since variations may be made in the embodiments of the invention illustrated and described above, it is to be understood that the invention is not restricted to the details thereof but is expressed by the following claims and their equivalents.

I claim:

1. Apparatus for breaking and separating small amounts of oil from large amounts of water in an oil-water mixture comprising a closed housing divided by vertical partitions into a first section and a plurality of successive sections, a foraminous separator-coalescer element of substantial wall thickness in each section extending vertically from the bottom to the top of the housing to form a well within the interior of each section around the separator element, the walls of the separator element having a circular cross-section, inlet means for the intake of the liquid mixture in the side of the housing adjacent the first section and communicating with the interior of the separator element in said first section at the bottom thereof, transfer ports at the bottom of the partition between the first section and the next succeeding section, a closed duct in said next succeeding section leading from said transfer ports to the interior of the separator element at the bottom thereof, transfer ports at the bottom of each partition separating the remaining succeeding sections and closed ducts leading from said transfer ports to the interior of the separator element at the bottom thereof in each such succeeding section, outlet means at the top of each section communicating with the interior of each separator element to pass oil outside of the housing, outlet means at the top of each section communicating with the top of the well of each section to pass oil outside of the housing, and outlet means adjacent the bottom of the well in the last succeeding section to pass water outside of the housing.

2. The subject matter of claim 1 characterized by the fact that the apparatus has three sections.

References Cited in the file of this patent

UNITED STATES PATENTS

| | | |
|---|---|---|
| 2,432,317 | Lawson et al. | Dec. 19, 1947 |
| 2,657,808 | Mankin | Nov. 3, 1953 |
| 2,919,030 | Grant et al. | Dec. 29, 1959 |

FOREIGN PATENTS

| | | |
|---|---|---|
| 5,995 | Great Britain | Mar. 11, 1898 |